US012811455B2

(12) United States Patent
Andraschko et al.

(10) Patent No.: US 12,811,455 B2
(45) Date of Patent: Nov. 24, 2026

(54) STATOR, ELECTRIC MACHINE AND METHOD FOR PRODUCING AT LEAST ONE WINDING

(71) Applicant: AUDI AG, Ingolstadt (DE)

(72) Inventors: Stephan Andraschko, Ehekirchen-Schönesberg (DE); Patrick Herrmann, Pfaffenhofen (DE); Philipp Uhlmann, Ingolstadt (DE)

(73) Assignee: Audi AG, Ingolstadt (DE)

( * ) Notice: Subject to any disclaimer, the term of this patent is extended or adjusted under 35 U.S.C. 154(b) by 920 days.

(21) Appl. No.: 18/162,550

(22) Filed: Jan. 31, 2023

(65) Prior Publication Data

US 2023/0246504 A1 Aug. 3, 2023

(30) Foreign Application Priority Data

Feb. 1, 2022 (DE) ......................... 102022102245.5

(51) Int. Cl.
*H02K 3/14* (2006.01)
*H02K 3/28* (2006.01)

(52) U.S. Cl.
CPC ................ *H02K 3/14* (2013.01); *H02K 3/28* (2013.01); *H02K 2213/03* (2013.01)

(58) Field of Classification Search
CPC ......... H02K 3/14; H02K 3/28; H02K 2213/03
See application file for complete search history.

(56) References Cited

U.S. PATENT DOCUMENTS

2021/0296956 A1 9/2021 Eilenberger
2021/0391116 A1 12/2021 Weber

FOREIGN PATENT DOCUMENTS

| | | | |
|---|---|---|---|
| CN | 110474451 | A | 11/2019 |
| CN | 111668960 | A | 9/2020 |
| CN | 109586444 | B | 10/2020 |
| CN | 112583167 | A | 3/2021 |
| CN | 112640262 | A | 4/2021 |
| CN | 113169610 | A | 7/2021 |
| DE | 102016105179 | A1 | 9/2016 |
| DE | 102018203469 | A1 | 9/2019 |
| DE | 102018218962 | A1 | 5/2020 |

(Continued)

*Primary Examiner* — Terrance L Kenerly

(74) *Attorney, Agent, or Firm* — Seed Intellectual Property Law Group LLP

(57) ABSTRACT

A stator for an electric machine comprises a winding support having multiple grooves and at least one conductor forming a respective winding for a respective phase of the stator, wherein a first and second conductor section of the conductor are formed respectively by multiple conductively interconnected conductor clips, wherein the conductor clips comprise respectively two groove sections, each being led through one of the grooves of the winding support, a coupling section connecting the groove sections, and two connection sections which protrude beyond the grooves on the side of the winding support situated opposite the coupling section, wherein the first and second conductor section are connected to each other in series by an intermediate conductor, wherein the intermediate conductor conductively connects exclusively one connection section of a conductor clip of the first conductor section to a connection section of a conductor clip of the second conductor section and is arranged radially within the connection sections on the side of the winding support situated opposite the coupling section.

15 Claims, 1 Drawing Sheet

(56) References Cited

FOREIGN PATENT DOCUMENTS

| | | | |
|---|---|---|---|
| DE | 102020113547 | A1 | 11/2021 |
| EP | 2437378 | A1 | 4/2012 |
| EP | 3687039 | A1 | 7/2020 |
| WO | WO 2019207448 | A1 | 10/2019 |

STATOR, ELECTRIC MACHINE AND METHOD FOR PRODUCING AT LEAST ONE WINDING

BACKGROUND

Technical Field

Embodiments of the invention relate to a stator for an electric machine, comprising a winding support having multiple grooves and at least one conductor forming a respective winding for a respective phase of the stator. Embodiments of the invention also relate to an electric machine as well as a method for producing at least one winding for an electric machine.

Description of the Related Art

Stators of electric machines with high power density, such as those for drive machines of motor vehicles, are often manufactured in the so-called hairpin design. In this process, U-shaped bent conductor sections also known as conductor clips or hairpins are installed axially in grooves of a winding support or stator laminated core. The free ends of the hairpins are twisted in the following step by a defined angle concentrically to the stator axis or the axis of rotation of the electric machine. The ends lying next to each other are then welded.

This production method is usually relative inflexible, so that for example multiple separate fabrication lines are required in order to manufacture multiple motor classes. However, it is known from document DE 10 2018 218 962 A1 that one can switch for example between a parallel and a series connection of conductor clip groups by a slight variation of the twisting or welding process. For this, it is proposed in that document to bend with a separate radius a connection section which prolongs a groove section lying entirely inside or outside in the respective groove prior to the twisting, so that it can be moved in the circumferential direction contrary to its usual twisting direction, thereby connecting conductor sections with different direction of rotation.

If the described method is carried out for at least one radially inward situated connection section, this typically results in a decreasing of the available design space for the rotor axially adjacent to the winding support, as compared to the region of the winding support itself. This can be problematical in particular when a rotor with rotor winding is to be used, for example, for an externally excited synchronous machine. In this case, the mentioned reduction in design space means that the winding heads of the rotor winding situated in this region have to be conical in design. This reduces on the one hand the available surface for the winding heads, so that substantial sacrifice of power and efficiency may occur as compared to the ideal design. On the other hand, further components are needed, such as reinforcing rings, which are typically more expensive or costly to produce in this case, since special manufacturing methods must be used.

BRIEF SUMMARY

Some embodiments include a stator for an electric machine, comprising a winding support having multiple grooves and at least one conductor forming a respective winding for a respective phase of the stator, wherein a first and second conductor section of the conductor are formed respectively by multiple conductively interconnected conductor clips, wherein the conductor clips comprise respectively two groove sections, each being led through one of the grooves of the winding support, a coupling section connecting the groove sections, and two connection sections which protrude beyond the grooves on the side of the winding support situated opposite the coupling section. Some embodiments relate to an electric machine as well as a method for producing at least one winding for an electric machine.

Some embodiments include an electric machine which can be manufactured in a highly automated manner, while at the same time avoiding the mentioned shortcomings.

Some embodiments include a stator of the kind mentioned above, wherein the first and second conductor section are connected to each other in series by an intermediate conductor, wherein the intermediate conductor conductively connects exclusively one connection section of a conductor clip of the first conductor section to a connection section of a conductor clip of the second conductor section and is arranged radially within the connection sections on the side of the winding support situated opposite the coupling section.

By using a separate intermediate conductor for connection of the conductor sections, as opposed to the above explained guiding of the connection section at a smaller radius, the decreasing of the design space for the rotor can occur only at a certain distance from the end of the winding support, so that additional design space can be provided for the rotor, especially for the winding head of a rotor winding. Since the winding head of the stator generally protrudes in the axial direction significantly beyond the winding head of a rotor winding, one can utilize in particular that region of the stator winding head protruding beyond the rotor winding head to receive the intermediate conductor, i.e., a design space which is usually free and which does not curtail the design space for the rotor. In this way, in particular, the above explained conical configuration of the rotor winding head with the associated shortcomings can be avoided.

The intermediate conductor can be arranged for at least 90% or at least 95% of its length, especially for its entire length, in an axial section of the stator extending between the ends of the connection sections of the intermediate conductor facing away from the winding support and the winding support. In particular, the two ends of the intermediate conductor can be basically flush with the end surface of the connection sections facing away from the winding support, so that the connection between the intermediate conductor and the connection sections can be done with the same methods, and especially in the same process, as the connection of the connection sections of different conductor clips to each other, for example by laser welding or the like.

The end sections of the intermediate conductor can at first extend basically axially in the direction of the winding support and be connected for example by an intermediate section extending basically in the circumferential direction, so that on the whole an approximately U shape of the intermediate conductor results. By suitable choice of the axial extension of the intermediate conductor, one can assure a sufficient spacing between the axial end of the winding support and the intermediate conductor in order to provide design space for a rotor winding or other components. In the described instance, the total length of the intermediate conductor thus lies in the axial section. Due to manufacturing tolerances and the like, however, it is possible for the intermediate conductor to extend slightly beyond the end surfaces of the connection sections in the axial direction and therefore not lie with its entire length in the mentioned axial section.

Hairpin windings typically end in the connection sections of the different conductor clips at the same axial position, apart from manufacturing tolerances. Thus, the explained arrangement means that the intermediate conductor lies substantially entirely within the basket-shaped winding head of the stator winding.

The intermediate conductor may consist of the same material and/or has the same cross section as the conductor clips. In addition or alternatively, both the intermediate conductor and the conductor clips have an insulation layer at least for a portion, while the insulation layers of the conductor clips and the intermediate conductor consist of the same material and/or have the same thickness. In particular, the intermediate conductor can differ from the conductor clips only in its length and/or shape.

Several benefits result from the explained properties. On the one hand, the intermediate conductor can be made from the same basic material, such as the same profiled wire, as the conductor clips. On the other hand, the connection between different connection sections and between a connection section and the intermediate conductor can be produced by the same connection process, especially with the same parameters, e.g., by laser welding. Thus, the additional expense for producing the stator described herein, as compared to a conventional stator, is basically limited to the arrangement of the intermediate conductor, since the same manufacturing steps can otherwise be carried out.

Each time a stack of multiple groove sections of different conductor clips stacked in the radial direction can be arranged in the grooves, while the connection sections which are connected by the respective intermediate conductor prolong a respective groove section which is arranged in the respective groove at the radially innermost position of the stack of the groove section. In other words, the connection sections connected by the intermediate conductor can lie against the inner edge surface of the winding head of the stators, so that the intermediate conductor can be situated adjacent to this edge surface, without disturbing the further winding scheme and without requiring an axial prolongation of the winding head, such as would be necessary e.g., if other conductor clips reach through the intermediate conductor.

Some embodiments relate to an electric machine having a stator as described herein and a rotor. The electric machine can be in particular an electric machine for a motor vehicle, especially a drive machine for a motor vehicle.

The electric machine can be an electric machine having a rotor winding, wherein the intermediate conductor can be arranged for at least 90% or at least 95% of its length, especially for its entire length, in an axial section of the electric machine, extending from the ends of the connection sections connected by the intermediate conductor that are facing away from the winding support to the rotor winding. The rotor winding or its winding head may terminate in the axial direction before the next section of the intermediate conductor situated on the winding support, so that this does not curtail the available design space for the rotor winding in the radial direction. As already explained above, this can be achieved without problems by suitable choice of the axial dimension of the intermediate conductor.

The electric machine can be in particular an externally excited electric machine, but also a series or shunt machine, a synchronous machine with permanent magnets, a synchronous reluctance machine or an asynchronous machine or the like.

At least 70% or at least 85% of the volume of the respective intermediate conductor can be arranged in a radial section of the electric machine which extends from a rotor shaft of the rotor to the inner surface of the winding support. In cases where the inner surface of the connected connection sections lies substantially flush with the inner surface of the winding support, the entire volume of the respective intermediate conductor can even be arranged in the indicated radial section. However, it is also possible for the winding support to extend somewhat beyond these inner surfaces inwardly in the radial direction, so that a certain volume portion of the intermediate conductor can overlap in the radial direction with the winding support.

For a current flow through the respective conductor from a first connection point to a second connection point of the respective winding, the current in the coupling sections of all conductor clips of the first conductor section can be taken by a first direction of rotation and that in the coupling sections of all conductor clips of the second conductor section can be taken by a second direction of rotation, opposite the first direction of rotation, about an axis of rotation of the electric machine. In this case, the connection of the conductor sections serves for reversal of the direction of rotation of the conductor or the current flow.

This may be advantageous, for example, in order to change a winding scheme which calls for two parallel windings at first so that these windings are hooked up in series by using the intermediate conductor. The use of the intermediate conductor thus makes it possible, for example, to produce electric machines with different designs in the same production line, since the design of the electric machine can be changed by a simple modification.

For a current flow through the respective conductor from the first connection point to the second connection point of the respective winding, the current in the coupling sections of conductor clips of a third conductor section can be taken by the second direction of rotation about the axis of rotation of the electric machine, the first conductor section being hooked up in series between the second and third conductor sections. Thus, two reversal points can be provided for the direction of rotation of the conductor or the current flow, which may be especially convenient for basically free selection of the position of the connection points within the conductor. As explained above, an inner reversal point can be realized here in particular by the intermediate conductor.

A further reversal point at the radially outer edge of the winding can be implemented by a further intermediate conductor. To simplify the winding, however, it may be advantageous to implement the outer reversal point, as explained in the above cited document DE 10 2018 218 962 A1, by laying the connection section at a separate radius and a twisting in the opposite direction to the other connection section of the same radius, since the design space for the rotor is not curtailed by laying the connection section on the outside.

Some embodiments relate to a method for producing at least one winding for an electric machine, which includes the following steps:

- providing a winding support, multiple conductor clips and one intermediate conductor per winding;
- axial pushing of the conductor clips into the winding support such that two groove sections of each conductor clip lie in a respective groove of the winding support and two connection sections prolonging the respective groove section protrude axially beyond the grooves on one side of the winding support;

conductively connecting a first subgroup of the conductor clips of the respective winding by their respective connection sections to form a first respective conductor section;

conductively connecting a second subgroup of the conductor clips of the respective winding by their respective connection sections to form a second respective conductor section; and conductively connecting the respective first and second conductor sections in series by the respective intermediate conductor to provide the conductor of the respective winding, wherein the intermediate conductor is arranged radially within the connection sections on the same side of the winding support as the connection sections and is conductively connected exclusively to a connection section of a conductor clip of the respective first conductor section and to a connection section of a conductor clip of the respective second conductor section.

The method described herein can be used in particular to produce the stator described herein or as part of a method for producing an electric machine in which the electric machine can be produced in particular. Regardless of this, the features explained for the stator described herein or the electric machine described herein, with the benefits mentioned there, can be applied to the method described herein and vice versa.

The conductive connecting of the respective subgroup of the conductor clips or the conductor sections by using the intermediate conductor can be done in particular by welding the connection sections to each other or to the intermediate conductor. Corresponding connection methods are customary in the context of hairpin windings and will therefore not be explained in detail. As explained above, the intermediate conductor can in particular correspond for the most part to the conductor clips, for example in regard to material, cross section or insulation, so that customary connection methods can basically be used with no modifications.

The three above mentioned steps for making conductive connections can be performed in any desired sequence or also be nested in each other. For example, each time all necessary connections for a groove or layer between all connection sections there and intermediate conductors can be done groove by groove or layer by layer.

Prior to the conductive connecting of the conductor clips of the respective subgroup, a twisting of the connection sections can be done, as is generally known in the field of the production of hairpin windings, and in particular connection sections lying at the same radius are bent in the same direction. For layers which are adjacent in the radial direction, a twisting can be done in different directions. Each time before and/or after the twisting or the conductive connecting, a widening of the winding head in the radial direction can be done, so that at least portions of the consecutive connection sections in the radial direction can be pulled or pressed apart.

In the method described herein multiple windings can be produced, wherein the intermediate conductor of some or all windings are connected to each other, in particular, they are braided and/or glued and/or connected by a plastic holder, and then they are together arranged radially within the connection sections on the same side of the winding support as the connection sections prior to being connected to the respective connection sections. This can make it possible for the complexity of the manufacturing process to remain low even when using relatively many windings or conductors or intermediate conductors, since it is only necessary to manipulate a single individual component comprising all the intermediate conductors or a relatively small number of additional components, namely, groups of connected intermediate conductors.

The plastic holder can be made in an injection molding process. In particular, the intermediate conductors being connected can be overmolded with plastic entirely or partially in an injection molding process, in order to make the plastic holder and at the same time support the intermediate conductor on this and thereby join them to each other.

BRIEF DESCRIPTION OF THE SEVERAL VIEWS OF THE DRAWINGS

Further benefits and details will emerge from the following embodiments as well as the corresponding drawings.

DETAILED DESCRIPTION

Figure 1:
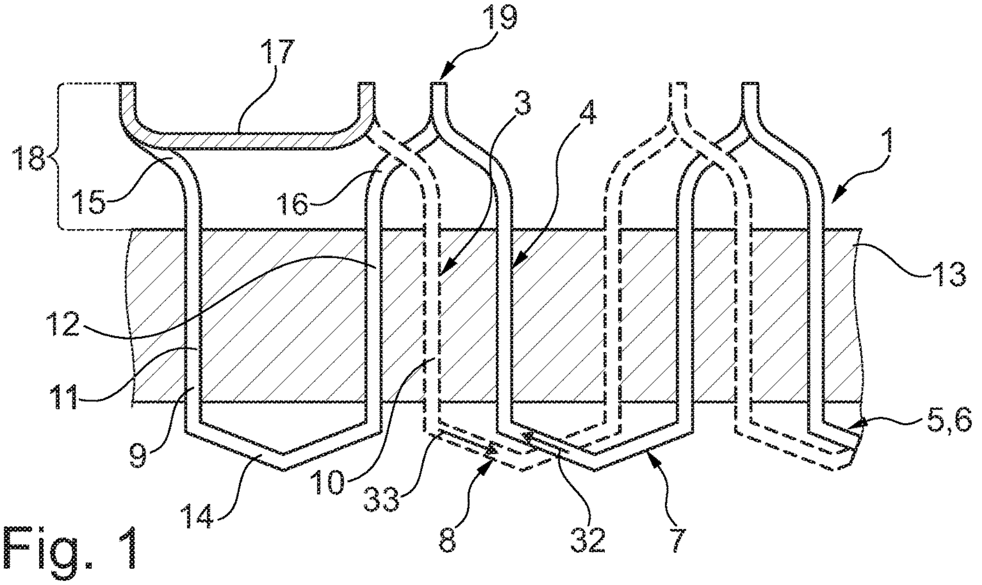
FIG. 1 shows a detail view of an embodiment of a stator, produced by an embodiment of a method.
Figure 2:
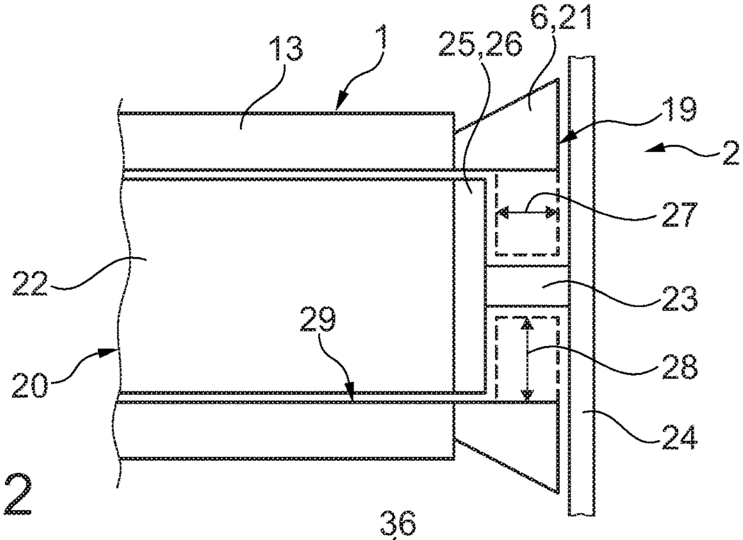
FIG. 2 shows a detailed view of an embodiment of an electric machine.

FIG. 1 shows a detailed view of a stator 1 of an electric machine 2, which is represented in FIG. 2. For reasons of clarity, only a cutout portion of the rolled-up stator 1 is shown, where a single conductor 5 of a single winding 6 of a single phase is represented and also only a single winding layer is represented. In a realistic application instance, typically multiple layers are used for multiple windings and multiple phases. The conductor clips 9, 10 of the two conductor sections 7, 8 or the grooves 3, 4 in which the groove sections 11, 12 of these conductor clips 9, 10 are arranged are shown uniformly spaced apart from each other. In realistic applications, however, groove sections 11, 12 with the same direction of current flow are grouped together, so that they would lie in directly adjacent grooves, for example, while groove sections 11, 12 with opposite direction of current flow are further spaced apart from each other.

In the course of producing the stator 1, at first the conductor clips 7, 8 are introduced axially, i.e., in the vertical direction in FIG. 1, into the winding support 13. The groove sections 11, 12 of the individual conductor clips 9, 10 are thus placed in the grooves 3, 4 of the winding support 13 and the connection sections 15, 16 protrude from the winding support 13 on that side of the winding support 13 situated opposite the coupling sections 14 of the conductor clips 7, 8.

The connection sections 15, 16 are then twisted as usual, in order to adopt the form shown in FIG. 1, while because of the slanted positioning normally used for the conductor clips 7, 8 their groove sections 11, 12 and thus also the connection sections 15, 16 come to lie at different radii and thus are bent in opposite directions to each other. This makes it possible to conductively connect adjacent conductor clips 9, 10 of the same conductor sections 7, 8 by their ends 19, for example, to weld them together. The procedure described thus far corresponds to the usual method for producing a hairpin winding and shall therefore be explained no further.

By contrast with the usual procedure, however, an intermediate conductor 17 is used in addition, by which the conductor sections 7, 8 are connected to each other in series. The intermediate conductor 17, being U-shaped in the present instance, is connected each time to one connection section 15, 16 of one conductor clip 9, 10 of the two conductor sections 7, 8. This results in a continuous conductor 5 for the winding 6.

The upper end of the intermediate conductor 17 shown in FIG. 1 closes flush with the ends 19 of the connection sections 15, 16 connected by it, so that the same connection techniques can be used for the contacting of the intermediate conductor 17 as are used for the connecting of the connection sections 15, 16 to each other in the context of providing the hairpin winding. This is additionally helped if the intermediate conductor 17 is made of the same profile wire as the conductor clips 9, 10 or generally consists of the same material, has the same cross section, and in particular is insulated in the same way.

In the example shown, the intermediate conductor 17 extends from the ends 19 of the connection sections 15, 16 axially solely in the direction of the winding support 13 and it is thus at least substantially arranged for its entire length in the axial section 18 of the stator 1 extending between the ends 19 of the connection sections 15, 16 facing away from the winding support 13 and the winding support 13.

The intermediate conductor 17 may be connected to connection sections 15, 16 which prolong groove sections 11, 12 of the respective conductor clip 8, 9, being arranged in the respective groove 3, 4 at the radially innermost position of a stack of groove sections 11, 12. Thus, the intermediate conductor 17 in the example is received entirely within the winding head 21 of the stator winding, so that the use of the intermediate conductor 17 neither prolongs the stator 1 axially nor increases its outer circumference.

The electric machine 2 shown in FIG. 2 is an externally excited electric machine 2. The rotor 20 in the example is formed by a laminated core 22 mounted on the rotor shaft 23, carrying a rotor winding 25, of which only the winding head 26 is shown. The winding head 26 of such a rotor winding 25 typically protrudes beyond the winding support 13 of the stator 1, so that the winding head 21 of the winding 6 should not if possible protrude to the inside in direct proximity to the winding support 13 beyond its inner surface 29.

This can be accomplished with especially simple means in the layout of the winding shown schematically in FIG. 1, by using an intermediate conductor 17 with sufficiently small dimension in the axial direction, i.e., in the vertical direction in FIG. 1 or in the transverse direction in FIG. 2. Since the intermediate conductor 17 begins in the region of the ends 19 of the connection sections 15, 16, it can lie entirely or substantially entirely within the axial sections 27 of the electric machine 2, which extends from the ends 19 of the connection sections 15, 16 connected by the intermediate conductor 17 and facing away from the winding support 13 to the rotor winding 25. In this way, it can be prevented that the radially available design space for the winding head 26 needs to be curtailed, which would mean for example that this winding head 26 would have to be shaped conically, so that the efficiency of the machine 2 might decrease or its manufacture might be more expensive.

Since the intermediate conductor 17, as already explained, may have the same or at least a similar cross section to the conductor clips 9, 10, it can be received without problem entirely in the radial section 28 of the electric machine, which extends from the rotor shaft 23 of the rotor 20 to the inner surface 29 of the winding support 13 or the winding head 21 of the stator 1. In this way, the intermediate conductor 17 can be received entirely in the design space shown hatched in FIG. 2, which typically remains free in customary electric machines, so that the described process is especially efficient in terms of design space.

Figure 3:
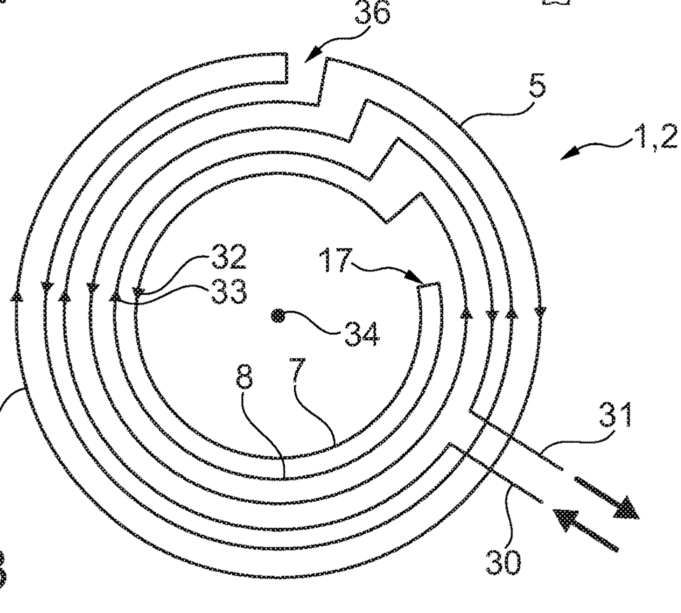
FIG. 3 shows current flow in an embodiment of an electric machine upon energizing a winding of the stator.

The layout of the winding 6 shown schematically in FIG. 1 means that, upon energization of the winding, the current in the coupling sections 14 of all conductor clips 9 of the first conductor section 7 is taken with a first direction of rotation 32 and that in the in coupling sections 14 of all conductor clips 10 of the second conductor section 8 is taken with a second direction of rotation 33, opposite to the first direction of rotation 32, about an axis of rotation 34 of the electric machine 1, shown schematically in FIG. 3. The current directions and their direction of rotation 32, 33 are shown by arrows in FIG. 1.

As shown schematically in FIG. 3, by using an additional reversal point 36 for the direction of laying of the conductor 5 or the direction of rotation 32, 33 of the current, the current in three consecutive conductor sections 7, 8, 35 can be taken alternating with different direction of rotation 32, 33 about the axis of rotation 34 of the electric machine.

This may be advantageous, since the winding 6 in this case can be built at first as a closed conductor loop, for example, and then the connection points 30, 31 can be prepared by dividing the conductor 5 at any desired spot. This makes it possible, for example, to lay the connection points 30, 31 of different windings or different phases in a common range of spatial angles in order to facilitate the contacting or the like.

Because the reversal of the current direction occurs through the intermediate conductor 17 at the inner edge of the winding 6, the design space for the rotor 20 or its rotor winding 25 will not be curtailed. The outer reversal point 36, as already explained in the general section, can either be realized by using a further intermediate conductor or by changing the laying of one of the connection sections 15, 16 to a separate plane and a twisting in a reversed direction.

German patent application no. 10 2022 102245.5, filed Feb. 1, 2022, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A stator for an electric machine, comprising: a winding support having multiple grooves and at least one conductor forming a respective winding for a respective phase of the stator, wherein a first and second conductor section of the conductor are formed respectively by multiple conductively interconnected conductor clips, wherein the conductor clips comprise respectively two groove sections, each being led through one of the grooves of the winding support, a coupling section connecting the groove sections, and two connection sections which protrude beyond the grooves on a side of the winding support situated opposite the coupling section, wherein the first and second conductor section are connected to each other in series by an intermediate conductor, and wherein the intermediate conductor conductively connects exclusively one connection section of a conductor clip of the first conductor section to a connection section of a conductor clip of the second conductor section and is arranged radially within the connection sections on the side of the winding support situated opposite the coupling section, and wherein the stator comprises a plurality of windings, wherein the intermediate conductors of some or all of the plurality of windings are directly connected to one another by way of being interwoven and/or bonded and/or connected via a plastic holder, and are arranged together radially inside the connecting sections on the same side of the winding support as the connecting sections.

2. The stator according to claim 1, wherein the intermediate conductor is arranged for at least 90% of its length in an axial section of the stator extending between the ends of the connection sections of the intermediate conductor, facing away from the winding support, and the winding support.

3. The stator according to claim 1, wherein the intermediate conductor is arranged for at least 95% of its length in an axial section of the stator extending between the ends of the connection sections of the intermediate conductor, facing away from the winding support, and the winding support.

4. The stator according to claim 1, wherein the intermediate conductor is arranged for its entire length in an axial section of the stator extending between the ends of the connection sections of the intermediate conductor, facing away from the winding support, and the winding support.

5. The stator according to claim 1, wherein the intermediate conductor consists of the same material and/or has the same cross section as the conductor clips and/or both the intermediate conductor and the conductor clips have an insulation layer at least for a portion, while the insulation layers of the conductor clips and the intermediate conductor consist of the same material and/or have the same thickness.

6. The stator according to claim 1, wherein each time a stack of multiple groove sections of different conductor clips stacked in the radial direction is arranged in the grooves, while the connection sections which are connected by the respective intermediate conductor prolong a respective groove section which is arranged in the respective groove at the radially innermost position of the stack of the groove section.

7. An electric machine, comprising:

a stator according to claim 1; and a rotor.

8. The electric machine according to claim 7, wherein the electric machine is an electrically excited electric machine having a rotor winding, wherein the intermediate conductor is arranged for at least 90% of its length in an axial section of the electric machine, extending from the ends of the connection sections connected by the intermediate conductor that are facing away from the winding support to the rotor winding.

9. The electric machine according to claim 7, wherein the electric machine is an electrically excited electric machine having a rotor winding, wherein the intermediate conductor is arranged for at least 95% of its length in an axial section of the electric machine, extending from the ends of the connection sections connected by the intermediate conductor that are facing away from the winding support to the rotor winding.

10. The electric machine according to claim 7, wherein the electric machine is an electrically excited electric machine having a rotor winding, wherein the intermediate conductor is arranged for its entire length in an axial section of the electric machine, extending from the ends of the connection sections connected by the intermediate conductor that are facing away from the winding support to the rotor winding.

11. The electric machine according to claim 7, wherein at least 70% of the volume of the respective intermediate conductor is arranged in a radial section of the electric machine which extends from a rotor shaft of the rotor to the inner surface of the winding support.

12. The electric machine according to claim 7, wherein at least 85% of the volume of the respective intermediate conductor is arranged in a radial section of the electric machine which extends from a rotor shaft of the rotor to the inner surface of the winding support.

13. The electric machine according to claim 7, wherein, for a current flow through the respective conductor from a first connection point to a second connection point of the respective winding, the current in the coupling sections of all conductor clips of the first conductor section is taken by a first direction of rotation and that in the coupling sections of all conductor clips of the second conductor section is taken by a second direction of rotation, opposite the first direction of rotation, about an axis of rotation of the electric machine.

14. The electric machine according to claim 13 wherein, for a current flow through the respective conductor from the first connection point to the second connection point of the respective winding, the current in the coupling sections of conductor clips of a third conductor section is taken by the second direction of rotation about the axis of rotation of the electric machine, the first conductor section being hooked up in series between the second and third conductor sections.

15. A method for producing at least one winding for an electric machine, comprising:

providing a winding support, multiple conductor clips and one intermediate conductor per winding, axial pushing of the conductor clips into the winding support such that two groove sections of each conductor clip lie in a respective groove of the winding support and two connection sections prolonging the respective groove section protrude axially beyond the grooves on one side of the winding support, conductively connecting a first subgroup of the conductor clips of the respective winding by their respective connection sections to form a first respective conductor section, conductively connecting a second subgroup of the conductor clips of the respective winding by their respective connection sections to form a second respective conductor section, and conductively connecting the respective first and second conductor sections in series by the respective intermediate conductor to provide the conductor of the respective winding, wherein the intermediate conductor is arranged radially within the connection sections on the same side of the winding support as the connection sections and is conductively connected exclusively to a connection section of a conductor clip of the respective first conductor section and to a connection section of a conductor clip of the respective second conductor section, wherein multiple windings are produced, wherein the intermediate conductor of some or all windings are connected to each other by way of being interwoven and/or bonded and/or connected via a plastic holder, and wherein the windings are arranged together radially inside the connection sections on the same side of the winding support as the connection sections prior to being connected to the respective connection sections.

* * * * *